(12) United States Patent
Dagorn et al.

(10) Patent No.: US 8,485,809 B2
(45) Date of Patent: Jul. 16, 2013

(54) DEVICE FOR ATTACHING A MOULD BASE ON A MEDIUM

(75) Inventors: Daniel Dagorn, Octeville sur Mer (FR); Thierry Lemble, Octeville sur Mer (FR); Julien Saleix, Annecy (FR); Fabrice Tarissan, Pringy (FR)

(73) Assignee: Sidel Participations, Octeville sur Mer (FR)

( * ) Notice: Subject to any disclaimer, the term of this patent is extended or adjusted under 35 U.S.C. 154(b) by 568 days.

(21) Appl. No.: 12/306,373

(22) PCT Filed: Jun. 25, 2007

(86) PCT No.: PCT/FR2007/001045
§ 371 (c)(1),
(2), (4) Date: May 27, 2011

(87) PCT Pub. No.: WO2008/000938
PCT Pub. Date: Jan. 3, 2008

(65) Prior Publication Data
US 2011/0223275 A1 Sep. 15, 2011

(30) Foreign Application Priority Data
Jun. 26, 2006 (FR) .................... 06 05696

(51) Int. Cl.
B29C 33/30 (2006.01)

(52) U.S. Cl.
USPC ............ 425/182; 425/161; 425/179; 249/168

(58) Field of Classification Search
CPC ...................................... B29C 33/306
USPC .................... 425/161, 179, 182; 249/168
See application file for complete search history.

(56) References Cited

U.S. PATENT DOCUMENTS 3,825,387 A * 7/1974 Gilman ............ 425/182
5,750,161 A * 5/1998 Schock et al. ......... 425/182

* cited by examiner

Primary Examiner — Yogendra Gupta
Assistant Examiner — Alison Hindenlang
(74) Attorney, Agent, or Firm — Sughrue Mion, PLLC

(57) ABSTRACT

A removable device (3) for attaching with fluidic connection a mold base (1) on a support (4), said device (3) comprising a male part (6) and a female part (7), said male part (6) having a truncated-cone-shaped surface (10), said female part (7) comprising a locking mechanism (26) including balls (33) suitable for engaging with said surface (10), a device wherein the female part (7) comprises a peripheral cage (27) provided with holes (2) where the balls (33) are seated, and a lock (34) provided with an annular ramp (41), mounted around said cage (27), that can be manually accessed and moved between a locking position wherein the ramp (41) is arranged in line with the balls (33), and a release position wherein the ramp (41) is separated from the balls (33).

15 Claims, 7 Drawing Sheets

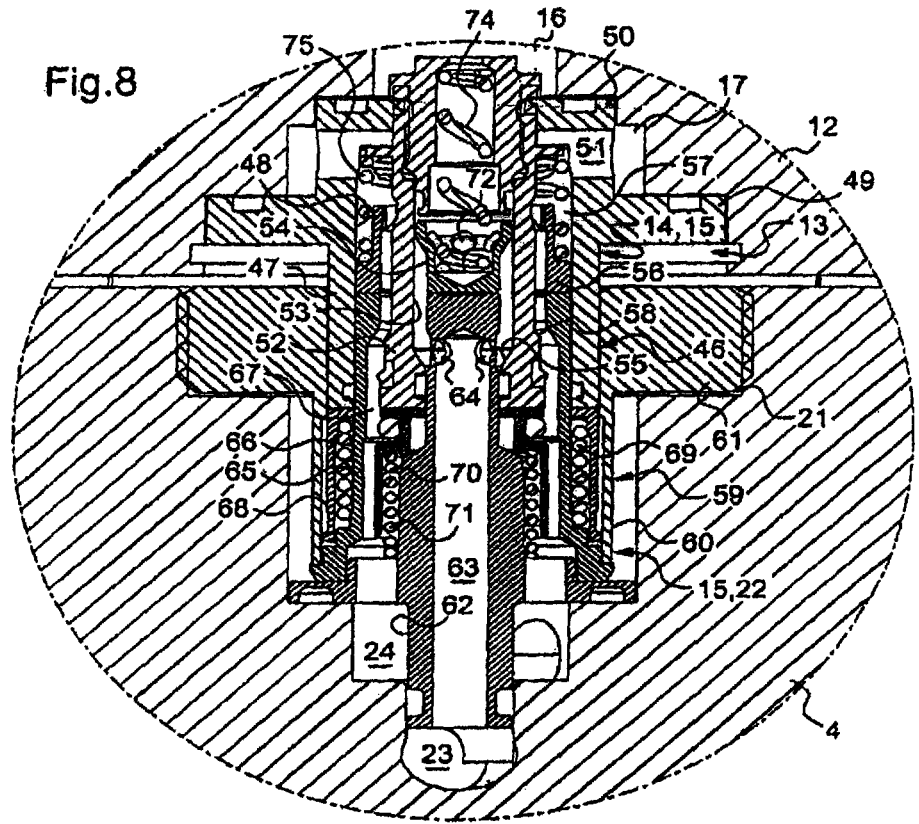
Fig.8
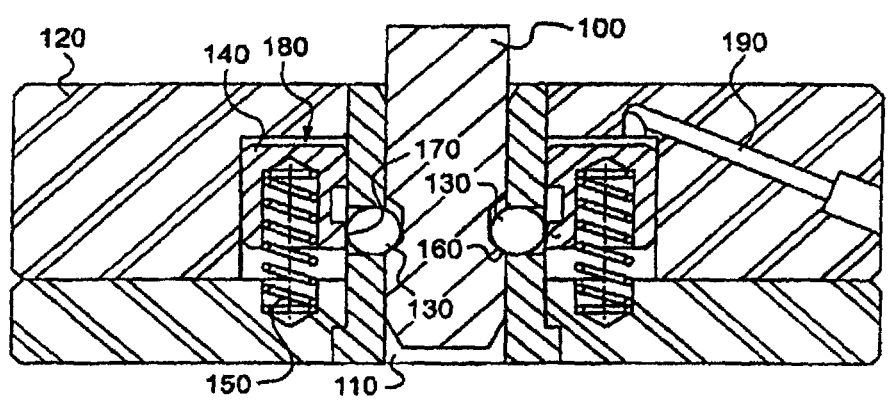
Fig.9 - Prior Art

DEVICE FOR ATTACHING A MOULD BASE ON A MEDIUM

The invention relates to the field of manufacturing containers, particularly by blowing or blow-drawing.

The blowing of containers takes place in a mold, provided with a cavity wherein a preheated preform (generally of thermoplastic material) is inserted, said preform being placed under pressure to impart a desired shape to it that corresponds to that of the cavity.

Modern molds are generally in three parts: two mold halves, articulated in a plane perpendicular to a principal axis of the mold, either in translation or in rotation around an ordinary hinge (the mold then being called a "book mold") and a mold base movable parallel to the axis of the mold.

Molds are generally temperature regulated, either to cool them in the more common applications, or to heat them in HR (heat resistant) type applications, wherein the containers undergo thermosetting consisting of keeping them temporarily in the heated mold in order to make them mechanically resistant to shrinkage when filled while hot. Ducts for the circulation of a heat transfer fluid (generally oil or water) are made for this purpose in the mold halves and in the mold base.

In an open configuration, the two mold halves are moved away from each other and the mold bottom is in a lower position, which allows the evacuation of a formed container and the insertion of a new preform. In a closed configuration, the mold bottom is in an upper position and the two mold halves are closed on it.

In order to allow the interchangeability of the mold bottom to enable the manufacture of containers of different varieties (and shapes) in the same machine, the mold bottom is ordinarily removably attached to a slidable support provided with an intake duct for the heat transfer fluid, and an evacuation duct. An attachment device with fluidic connection makes it possible to provide for the removable attachment of the mold bottom to the mounting plate, while still ensuring the sealed continuity of circulation of the heat transfer fluid.

According to a known technology, used until now by the applicant and illustrated in FIG. 9, the mold bottom (not shown) is attached to an interface forming a male part, provided with an end fitting 100 protruding from the center of the interface on the side opposite to the mold bottom, said end fitting 100 being fitted inside a hole 110 made in the center of the support 120. Balls 130, actuated pneumatically via a lock 140 mounted on springs 150, engage radially with a truncated-cone-shaped surface 160 of the end fitting 100 in order to lock said end fitting with respect to said support 120. The balls 110 are locked in position by means of a truncated-cone shaped ramp 170 formed on the lock 140, which lock is mounted in translation in an annular chamber 180 into which a duct 190 opens that carries air under pressure.

The fluidic connection is accomplished by means of two off-center cylindrical end fittings (not shown)—one for the intake and the other for the evacuation of the fluid, which end fittings protrude from the surface and fit into holes made facing the support, said holes constituting the ends of the intake duct and the evacuation duct, respectively.

One disadvantage of this technology, which has been and continues to be satisfactory, is that the presence of the central end fitting on the interface makes it impossible to set the mold bottom down or store it without the risk of colliding with the end fitting, which by knocking it out of alignment could make it difficult or even impossible to insert it into the mounting plate, thus preventing the coupling of the mold bottom and the support. The applicant has therefore wished to propose an alternative solution that remedies this disadvantage in particular.

To that end, the invention proposes a device for removably attaching with fluidic connection a mold bottom on a support, said device comprising a male part (for example carried by the mold bottom) and a female part (for example carried by the support), said male part having a truncated-cone-shaped surface, said female part comprising a locking mechanism including balls suitable for engaging with said surface, device wherein the female part comprises a peripheral cage provided with holes wherein balls are seated, and a lock provided with an annular ramp, mounted around said cage, that can be accessed manually and moved between a locking position wherein the ramp is in line with the balls, and a release position wherein the ramp is separated from the balls.

The peripheral arrangement of the locking mechanism has two advantages. First, the manual accessibility of the mechanism can facilitate the replacement of the mold bottom without the need to use pneumatic operation. Secondly, this arrangement allows a fluidic connection to be mounted in the center of the support, thus enhancing the compactness of the assembly.

According to one embodiment, the support has a central body surrounded by the peripheral cage, the body and the cage defining between them an annular space wherein a slide is movably mounted between a locking position in which it is in line with the balls, and a release position in which it is separated from the balls.

The cage and the body form, for example, a one-piece unit. The slide is preferably pushed toward its locking position by at least one return spring. Moreover, the body can be provided at its center with a recess for the fluidic connection. According to one embodiment, the recess defines an intake chamber for a heat transfer fluid and an evacuation chamber for said fluid.

The lock is preferably pushed toward its locking position by at least one return spring. According to one embodiment, the lock comprises a socket and an annular flange mounted in the socket and in which the ramp is formed.

Furthermore, the female part is preferably provided with a hole suitable for receiving a centering assembly pin with which the male part is provided.

Other objects and advantages of the invention will be seen from the following description, with reference to the appended drawings in which:

FIG. 8 is a view showing in large scale the fluidic connection in the configuration of FIG. 6;

FIG. 9 is a view in cross section of a device for attaching a mold bottom to a support, according to the prior art described above.

Figure 1:
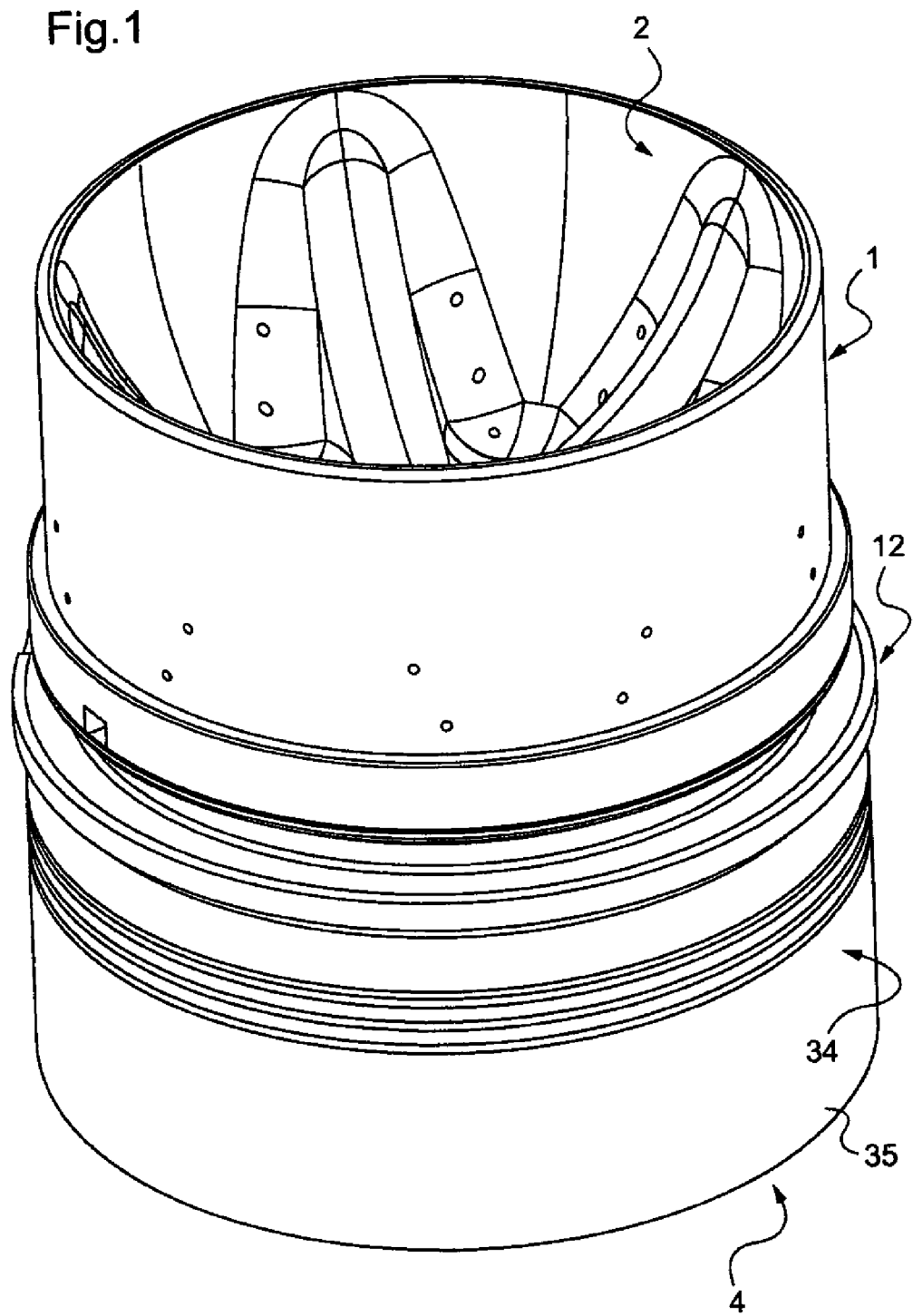
FIG. 1 is a view in perspective, about 1:1 scale, showing a mold bottom attached to a support.

Represented in FIG. 1 is a mold bottom 1 shown in the form of a metal block (steel or aluminum alloy) having, on an upper face, a hollow impression 2 intended to impart its shape to the bottom of a container.

Thanks to a removable attaching device 3, the mold bottom 1 is rigidly but not permanently mounted on a support 4, hereinafter called mounting plate, movable in an axial direction that coincides with a general axis of symmetry A of the mold bottom 1 and of the mounting plate 4.

The bottom 4 is provided with a duct 5 for the circulation of a heat transfer fluid, hollowed out in a spiral—or as a variation, in portions of concentric circles—in a lower face of the bottom 4, opposite the impression 2.

The attachment device 3 comprises a male part 6 and a female part 7. According to one embodiment, the female part 7 is carried by the mold bottom 1 and the male part 6 by the mounting plate 4. According to a preferred embodiment corresponding to the present description, the female part 7 is carried by the mounting plate 4 and the male part 6 by the mold bottom 1.

The male part 6 comprises a cylindrical ring 8 provided with, at an end opposite to the mold bottom 1, an outwardly projecting annular rim 9, defining a truncated-cone-shaped surface 10. The male part 6 further comprises an offset centering pin 11.

Figure 2:
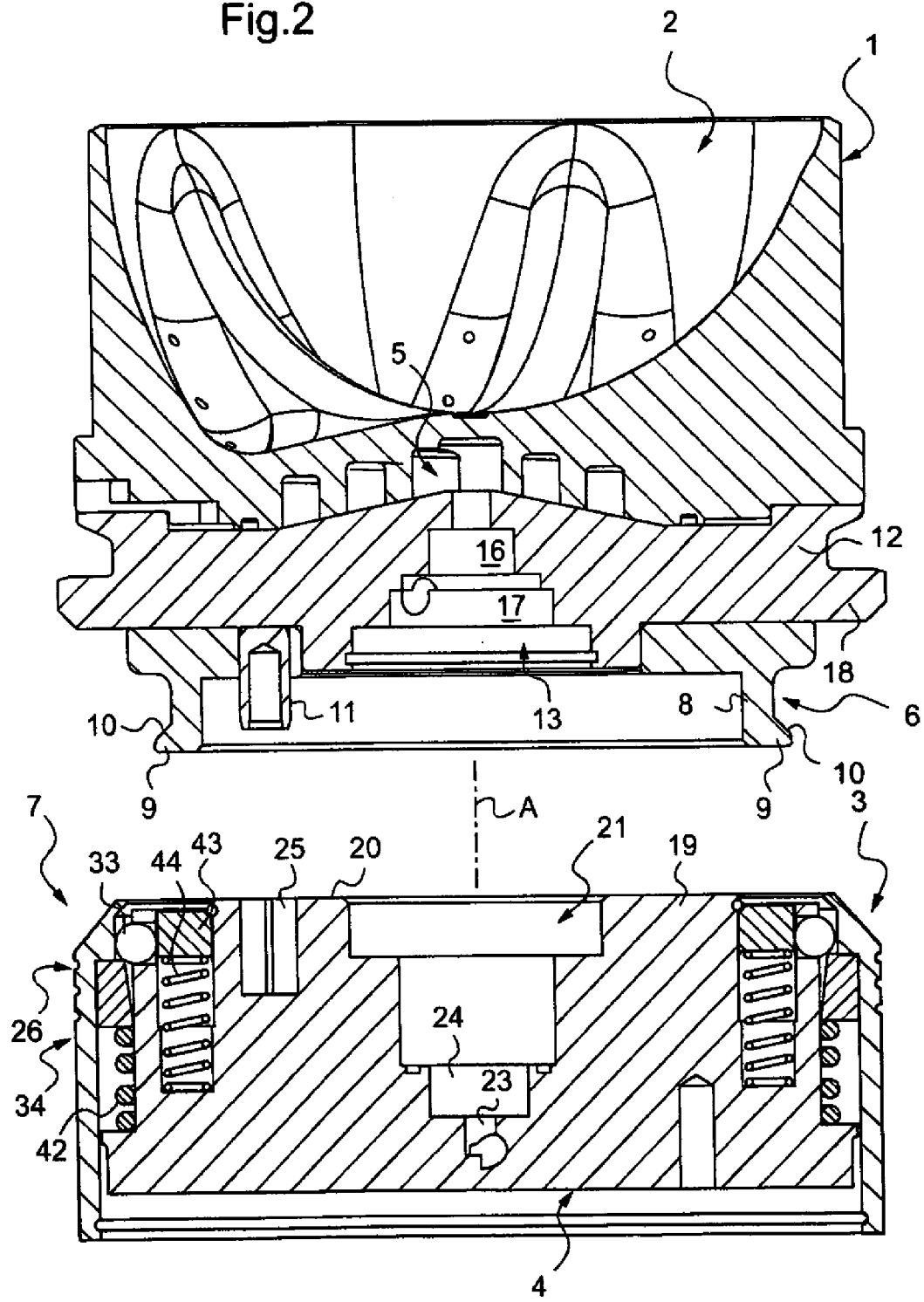
FIG. 2 is an elevation view in cross section, about 1:1 scale, of the mold bottom and the support, separated from each other.

The mold bottom 1 and the ring 8 are both fixed, opposite to each other, upon a sole plate 12 which forms an interface between the mold bottom 1 and the mounting plate 4. As can be seen in FIG. 2, the mounting plate 12 is provided at its center with a succession of bores forming a recess 13 for a male part 14 of a fluidic connection 15. The recess 13 is extended by an intake chamber 16 opening into a central portion of the duct 5.

Furthermore, the peripheral portion of the duct 5 is connected to the recess 13 by a channel bored in the sole plate 12 and opening into one of the bores, thus forming an evacuation chamber 17 of the fluid having circulated in the duct 5.

The sole plate 12 is provided around its perimeter with a flange 18 on which two mold halves (not shown) are fitted. A beveled edge ensures the mutual centering of the mold bottom 1 and the mold halves, which mold halves thus exert a significant load (several hundred newtons) on the sole plate 12 directed axially opposite to the mounting plate 4.

The mounting plate 4 comprises a cylindrical central body 19 provided at its center, on the side of an upper face 20 of the body, with a succession of bores forming a recess 21 for a female part 22 of the fluidic connection 15. Said recess 21 defines an intake chamber 23 into which an intake channel bored in the body 19 opens for the heat transfer fluid, and an evacuation chamber 24 in which a channel (not shown) also bored in the body 19 opens for evacuating the fluid. An offset bore 25 suitable for receiving the centering pin 11 of the male part 6 is made in the upper face 20 away from the central recess 21.

The female part 7 of the attachment device 3 comprises a mutual locking mechanism 26 for the mold bottom 1 and the mounting plate 4, which includes a peripheral tubular cage 27 surrounding the body 19 with which it forms a one-piece unit. The cage 27 has a larger diameter than the body 19, in such a way that an annular space 28 is defined between the cage 27 at the outside and the body 19 at the inside, which space opens into the upper face 20, and which is closed on the opposite side by a bottom 29.

The mounting plate 4 is radially extended beyond the cage 27 by a flange 30 which defines a collar 31 turned toward the upper face 20.

The cage 27 is bored through radially by an annular row of holes 32. The locking mechanism 26 comprises a plurality of balls 33 each seated in a hole 32. The holes 32 are cylindrical and have toward the interior a counterbore 73 which locally restricts the cross section, thus limiting the radial displacement of the balls 33 toward the interior.

The locking mechanism 26 further comprises a lock 34 slidably mounted on the mounting plate 4. Said lock 34 comprises a socket 35 provided with a cylindrical skirt 36 surrounding the mounting plate 4. The skirt 36 is extended, toward the upper face 20, by a section of smaller diameter formed by a bore 37 separated from the skirt 36 by a counterbore 38. At an upper end, beyond the bore 37, the socket 35 has a stricture formed by an internal bevel 39.

The lock 34 further comprises a mounted annular flange 40, fitted into the skirt 36 and inserted between said skirt and the cage 27, on which it can slide. The flange 40 defines toward the interior a truncated-cone-shaped ramp 41 the conicity of which is turned toward the upper face 20. A return spring 42 working in compression is mounted around the cage 27, being inserted between the flange 40 and the collar 31.

The lock 34 is thus axially movable by sliding the flange 40 on the cage 27, between a locking position (FIGS. 5, 6, 7) wherein the ramp 41 is in line with the balls 33 and exerts thereon a radial load directed toward the axis A, and a release position (FIGS. 2, 3, 4) wherein the ramp 41 is axially separated from the balls 33, and wherein the bore 37 is in line with said balls. The spring 42, which presses the flange 40 against the counterbore 38, continuously pushes the lock 34 toward its locking position.

Because of its peripheral arrangement, the socket 35 is manually accessible. The calibration of the spring 42 is preferably selected to allow the manual movement of the lock 34, countering the return force exerted by the spring 42, toward its release position.

Figure 3:
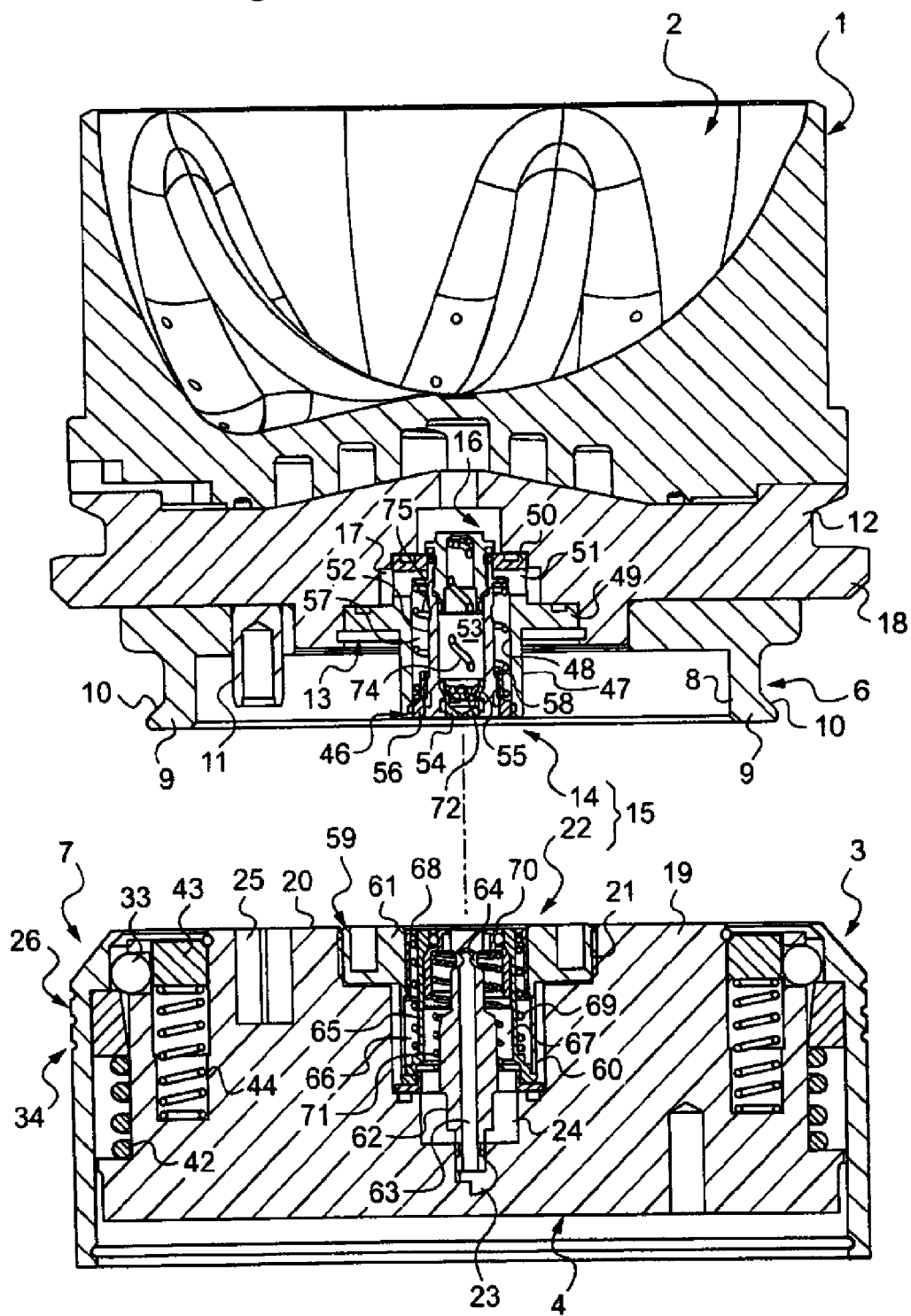
FIG. 3 is a similar view to FIG. 2, in which the fluidic connection is also shown.
Figure 4:
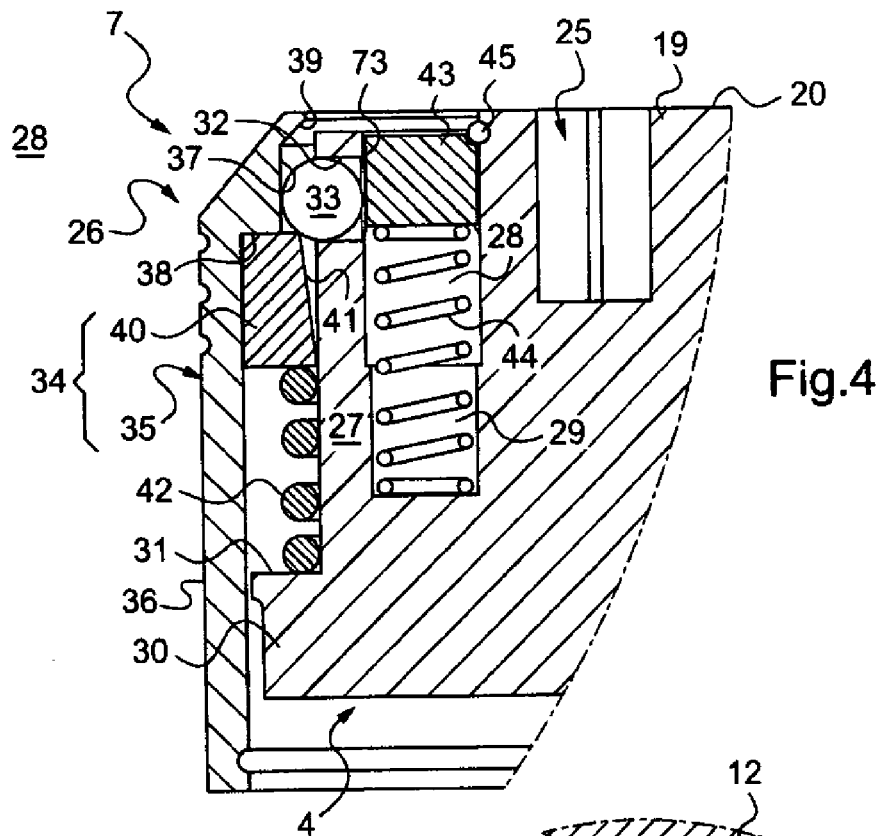
FIG. 4 is a view showing in larger scale a detail of the support in the configuration of FIG. 2 or FIG. 3.

The locking mechanism 26 further comprises an annular slide 43 mounted in the annular space 28 between the body 19 and the cage 27 and axially movable between a locking position in which it is separated from the balls 33 (FIGS. 5, 6, 7) and a release position in which it is in line with the balls 33 (FIGS. 2, 3, 4). Return springs 44 working in compression, inserted in the holes 29 made at the bottom of the annular space 28, continuously push the slide 43 toward its release position. An annular snap ring 45 is mounted around the body 19 at an upper end thereof. Said snap ring 45 forms a stop against which the slide 43 is pressed by the springs 44 in its release position. The snap ring 45 thus limits the travel of the slide 44 and prevents its withdrawal from the annular space 28.

Figure 7:
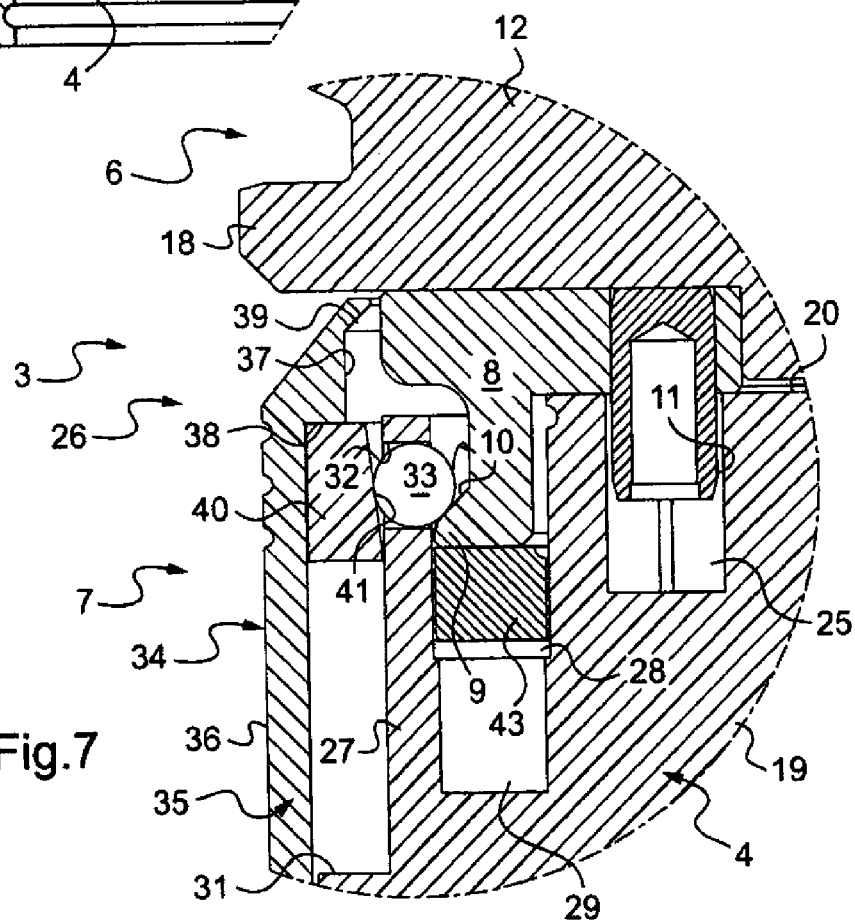
FIG. 7 is a view showing in large scale a detail of the support in the configuration of FIG. 5 or FIG. 6.
Figure 5:
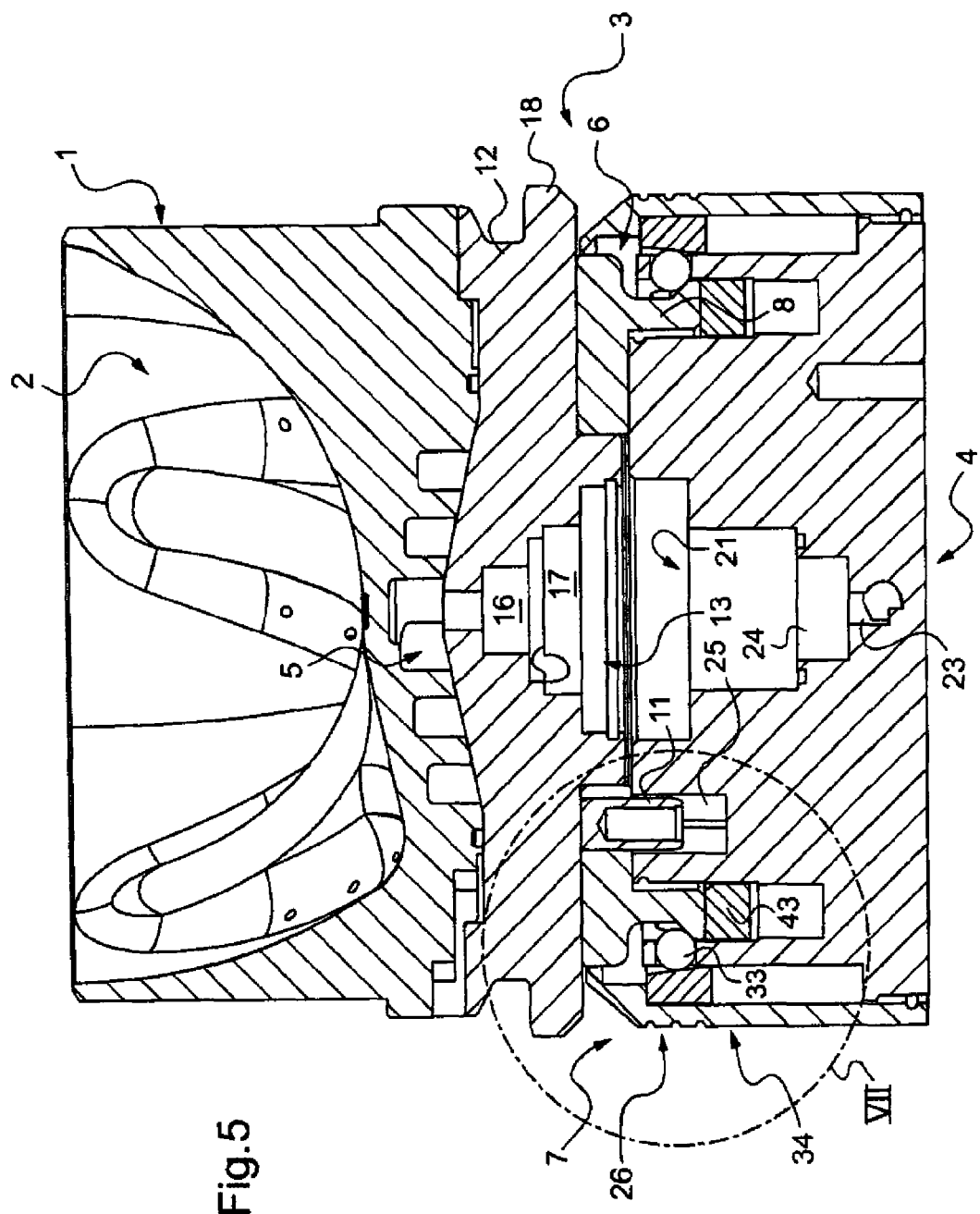
FIG. 5 is an elevation view in cross section, about 1:1 scale, of the mold bottom and the support coupled to each other.
Figure 6:
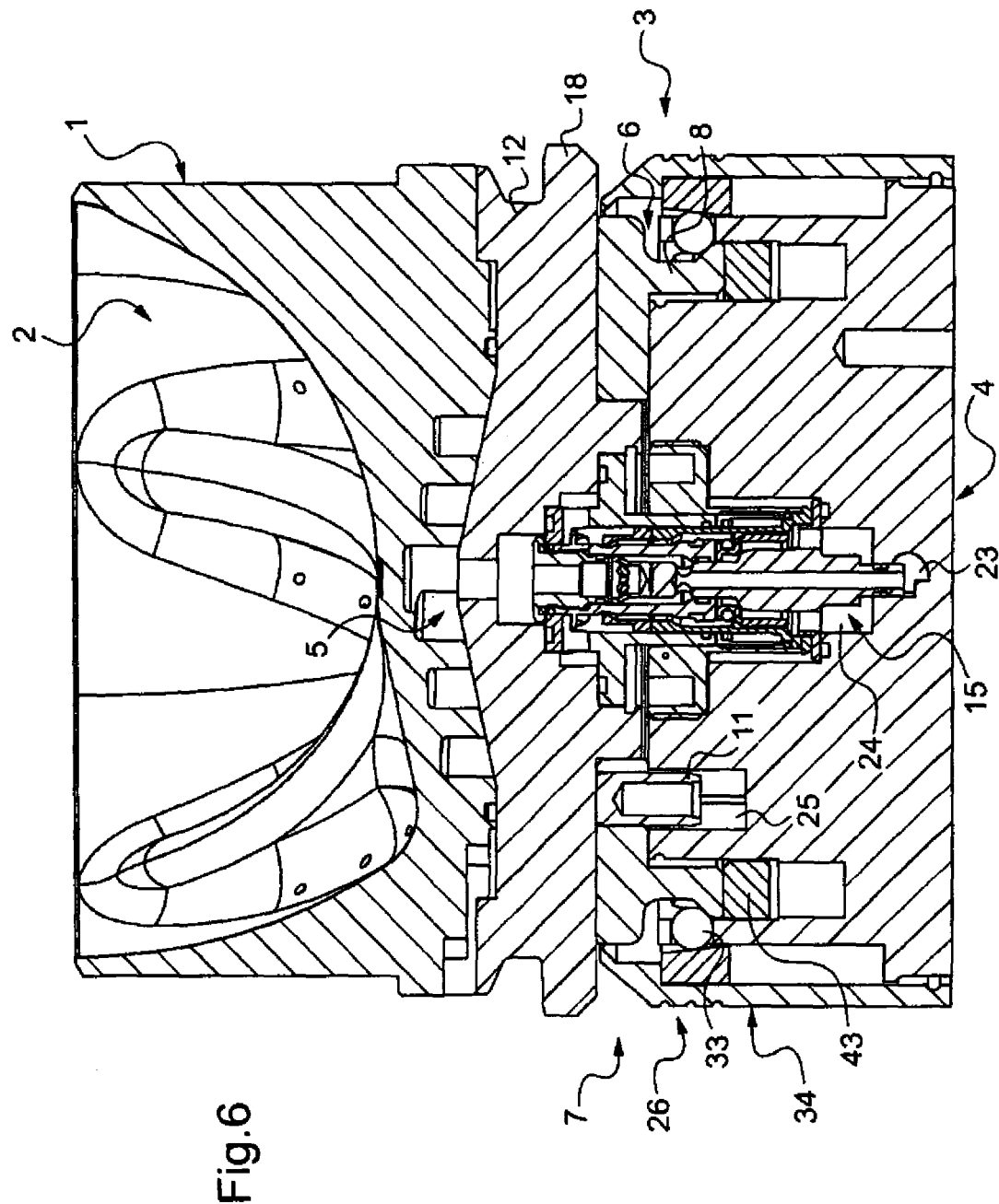
FIG. 6 is a similar view to FIG. 5, in which the fluidic connection is also shown.

It should be noted that for the purpose of simplification, in FIGS. 5, 6 and 7 the springs 42 and 44 are not shown.

The procedure for assembling the locking mechanism 26 is as follows. The spring 42 is first mounted around the cage 27. The lock 34, including the flange 40, is then mounted by slipping it onto the cage 27. The lock 34 is then pressed against the spring 42 until the seats 32 appear into which the balls 33 are inserted. The lock 34 is then released, the balls 33 being pushed to the bottom of their seats and coming to a stop against the counterbores 73. While maintaining the lock 34 in its unlocked position, wherein the balls 33 can radially leave their seats 32 while being applied against the bore 37, the springs 44 are mounted and the slide 43 is inserted into the annular space 28 by pushing it against the spring or springs 44. Finally, while maintaining the lock 34 in its release position and the slide 43 in the annular space 28, the snap ring 45 is mounted on the body 19 and the whole unit is released, thus achieving the assembly of the mechanism 26 simply and quickly.

The locking mechanism 26 can adopt two configurations, depending on the position of the lock 34 and the slide 43:
- a release configuration (FIGS. 2, 3, 4), wherein the lock 34 and the slide 43 are both in their release position, and wherein the balls 33 are held between the slide 43 and the bore 37 of the socket 35. As can be seen in FIG. 4, the balls 33 have a part projecting radially outward from their seat 32 and they butt against the flange 40 under the spring force exerted by the spring 42, which limits the travel of the lock 34 and prevents its separation from the mounting plate 4. In this configuration, the travel of the lock 34 is also limited in the other direction by the bevel 39, which like the flange 40 butts against the projecting part of the balls 33 (but the other side of the balls 33). The lock 34 is thus locked in its release position;
- a locking configuration (FIGS. 5, 6, 7), wherein the lock 34 and the slide 43 are both in their locking position. The slide 43, pressed against its return spring 44 toward its locking position and thus separated from the balls 33, allows said balls to be moved radially toward the axis A under the radial pressure exerted by the ramp 41.

The attachment of the male part 6 (and thus of the mold bottom 1) to the female part 7 (i.e., to the mounting plate 4) is performed as follows, starting with the release configuration of the female part 7 (FIGS. 2, 3, 4, 5). The male part 6 and the female part 7 are first arranged coaxially, orienting them angularly in such a way that the centering pin 11 is lined up with the hole 25. The male part 6 is then fitted into the female part 7, the ring 8 penetrating into the annular space 28 while pushing the slide 43 against the return force of the spring 44. Until the slide 43 reaches its locking position, the balls 33 remain immobile, maintaining the lock 43 in its release position. As soon as the slide 44 reaches its locking position, the balls 33 are pressed radially inwards by the flange 40 under the pressure from the spring 42, the lock 43 being abruptly moved into its locking position. In this position, the ramp 41 exerts a radial pressure on the balls 33, resulting in their being applied radially against the truncated-cone-shaped surface 10 of the ring 8, thus preventing said ring from being withdrawn from the annular space 28 and ensuring the attachment of the male part 6 onto the female part 7.

The protrusion of the counterbore 73 into the seat 32 is rather small in order that in the locked configuration of the female part 7 the balls 33, butted against the counterbore 73, can extend far enough beyond their seat 32 to ensure a solid hold of the male part 6, capable of resisting an axial tensile force of several dozen newtons corresponding to the tension exerted by the mold halves on the sole plate 12 during the closing of the mold.

In order to separate the male part 6 from the female part, the lock 34 is manually pushed toward its release position against the spring force exerted by the spring 42. As soon as the lock 43 [sic] has reached its release position, the balls 33 are free to move radially outward. Under the effect of the spring force exerted by the spring 44, the male part 6 is, by means of the slide 43, pushed out of the annular space 28, the truncated-cone-shaped surface 10 pushing the balls 33 radially outwards. The balls 33 being seated between the bevel 39 and the flange 40, they block the lock 34 in the release position while allowing the slide 43 to again occupy its release position, the female part 7 thus resuming its release configuration.

The fluidic connection will now be described.

The male part 14, mounted in a recess 13 made in the sole plate 12, includes a male end fitting 46 comprising:
- an extending protruding tubular sleeve 47 having a central bore 48,
- a flange 49 by which the end fitting 46 is attached to the sole plate 12,
- a cylindrical head 50 provided with radial through-holes 51, opening both into the bore 48 and into the evacuation chamber 17.

The male part 14 further comprises a jacket 52 mounted coaxially in the end fitting 46. The jacket 52 has a central through-bore 53 which is open at one lower end and opens at the opposite upper end into the intake chamber 16.

The male part 14 also comprises a movable valve 54 slidably mounted in the bore 53 of the jacket 52 at the lower end thereof. In a closed configuration of the male part 14, the valve 54, pushed by a spring 74 working in compression, is pressed against a truncated-cone-shaped seat 55 inside the jacket 52, thus sealing the lower end of the bore 53.

Finally, the male part 14 comprises a piston 56, slidably mounted in an annular space 57 defined between the jacket 52 and the sleeve 47. In the closed configuration of the male part 14, the piston 56, pushed by a spring 75 working in compression, is pressed against a truncated-cone-shaped seat 58 outside the jacket 52, sealing the annular space 57.

The female part 22 includes a female end fitting 59; comprising a tubular sleeve 60 onto which is mounted a flange 61 by which the end fitting 59 is screwed into the body 19 of the mounting plate 4.

The female part 22 further comprises a hollow central rod 62 mounted coaxially in the female end fitting 59 and screwed into the body 19 at the bottom of the recess 21. The rod 62 is provided with a bore 63 which opens at a lower end into the intake chamber 23. At an upper end, the rod 62 has radial through-holes 64 that open into the bore 63.

The female part 22 also comprises a liner 65, mounted coaxially in the end fitting 59 between the sleeve 60 and the rod 62, with which the liner 65 defines respectively an external annular space 66 and an internal annular space 67 that opens into the evacuation chamber 24.

The female part 22 further comprises a slide 68, mounted axially movable in the external annular space 66. In a closed configuration of the female part 22, the slide 68 occupies a closed position in which it seals the external annular space 66. A spring 69 mounted in the external annular space 66 continuously pushes the slide 68 toward its closed position.

Finally, the female part 22 comprises a capsule 70, mounted axially movable in the internal annular space 67. In a closed configuration of the female part 22, the capsule 70 occupies a closed position in which it seals the internal annular space 67. A spring 71 mounted in the internal annular space 67 continuously pushes the capsule 70 toward its closed position.

In the closed configuration of the female part 22 (configuration adopted when the mold bottom 1 and the mounting plate 4 are separated),
the intake chamber 23 and the evacuation chamber 24 are placed in communication via the bore 63 and the holes 64. The heat transfer fluid circulates from the intake chamber 23 through the bore 63 at the end of which it passes through the holes 64 into the internal annular space 67 and returns to the evacuation chamber 24.

When the mold bottom 1 is mounted on the mounting plate 4, the male part 14 of the fluidic connection 15 is fitted into the female part 22. The rod 62, inserted into the bore 53 of the jacket 52, pushes the valve 54 against its return spring 74. The liner 65, inserted into the annular space 57, pushes the piston

56 against its return spring 75. Reciprocally, the jacket 52, inserted into the internal annular space 67, pushes the capsule 70. The sleeve 60, inserted into the external annular space 66, pushes the slide 68.

The male part 14 and the female part 22, thus fitted together, both adopt an open configuration (FIGS. 6 and 8) in which:
- the radial holes 64 of the rod 62 open into the bore 53 of the jacket 52, thus placing in communication the intake chambers 16, 23 of the mounting plate 4 and the sole plate 12, thus allowing the duct 5 of the mold bottom 1 to be fed with heat transfer fluid;
- the capsule 70, pushed beyond the holes 64 of the rod 62, isolates its bore 63 from the internal annular space 67 (in other words, the capsule isolates the intake of fluid from its evacuation);
- the internal annular space 66 of the female end fitting 59 is placed in communication with the annular space 57 of the male end fitting 46, which allows the evacuation of the heat transfer fluid coming from the duct 5 of the mold bottom 1.

At the intake, the fluid passes through the bore 63 of the rod 62, leaves through the holes 64 in the bore 53 in the jacket 52, passes through the radial holes 72 made in the valve 54 and rejoins the duct 5 of the mold bottom 1 via the intake chamber 16.

At the evacuation, the fluid passes through the evacuation chamber 17, empties into the annular space 57 of the male end fitting 46 through the radial holes 51, and continues through the internal annular space 67 before rejoining the evacuation chamber 24.

As can be seen, the connection 15 just described allows a coaxial intake and evacuation of the heat transfer fluid. It is therefore possible to mount this connection 16 at the center of the mounting plate 4 and of the sole plate 14, thus enhancing the compactness of the assembly.

The invention claimed is:

1. A device (3) for removably attaching with fluidic connection a mold bottom (1) on a support (4), said device (3) comprising a male part (6) and a female part (7), said male part (6) having a truncated-cone-shaped surface (10), said female part (7) comprising:
    a locking mechanism (26) including balls (33) suitable for engaging with said truncated-cone-shaped surface (10);
    a peripheral cage (27) provided with holes (2) wherein the balls (33) are seated; and
    a lock (34) provided with an annular ramp (41), mounted around said peripheral cage (27), that is manually accessible and moved between a locking position wherein the ramp (41) is in line with the balls (33), and a release position wherein the ramp (41) is separated from the balls (33),
    wherein the support (4) has a central body (19) surrounded by the peripheral cage (27), the central body (19) and the peripheral cage (27) defining therebetween an annular space (28) wherein a slide (43) is movably mounted between a locking position in which it is in line with the balls (33), and a release position in which it is separated from the balls (33).

2. The device according to claim 1, wherein the peripheral cage (27) and the body (19) form a one-piece unit.

3. The device (3) as claimed in claim 1, wherein the slide (43) is pushed toward its locking position by at least one return spring (44).

4. The device (3) as claimed in claim 1, wherein the body (19) is provided at its center with a recess (21) for the fluidic connection.

5. The device (3) as claimed in claim 4, wherein the recess (21) defines an intake chamber (16) for a heat transfer fluid and an evacuation chamber (17) for the heat transfer fluid.

6. The device (3) as claimed in claim 1, wherein the lock (34) is pushed toward its locking position by at least one return spring (42).

7. The device (3) as claimed in claim 1, wherein the lock (34) comprises a socket (35) and an annular flange (40) mounted in the socket (35) and in which the ramp (41) is formed.

8. The device (3) as claimed in claim 1, wherein the female part (7) is provided with a hole (25) suitable for receiving a centering pin (11) with which the male part (6) is provided.

9. The device (3) as claimed in claim 1, wherein the male part (6) is carried by the mould bottom (1), and the female part (7) support (4).

10. A support (4) for the removable attachment of a mould bottom, said support comprising:
    a locking mechanism (26) including:
        a peripheral cage (27) provided with holes (2) wherein balls (33) are seated, and
        a lock (34) provided with an annular ramp (41), mounted around said peripheral cage (27) that is manually accessible and moved between a locking position wherein the ramp (41) is in line with the balls (33), and a release position wherein the ramp (41) is separated from the balls (33); and
    a central body (19) surrounded by the peripheral cage (27), the central body (19) and the peripheral cage (27) defining between therebetween an annular space (28) wherein a slide (43) is movably mounted between a locking position in which it is in line with the balls (33), and a release position in which it is separated from the balls (33).

11. The support (4) as claimed in claim 10, wherein the peripheral cage (27) and the body (19) form a one-piece unit.

12. The support (4) as claimed in claim 10, wherein the slide (43) is pushed toward its locking position by at least one return spring (44).

13. The support (4) as claimed in claim 10, wherein the body (19) is provided at its center with a recess (21) for the fluidic connection.

14. The support (4) as claimed in claim 13, wherein the recess (21) defines an intake chamber (16) for a heat transfer fluid and an evacuation chamber (17) for said heat transfer fluid.

15. The support (4) as claimed in claim 10, wherein the lock (34) comprises a socket (35) and an annular flange (40) mounted in the socket (35) and in which the ramp (41) is formed.

* * * * *